Patented Dec. 22, 1925.

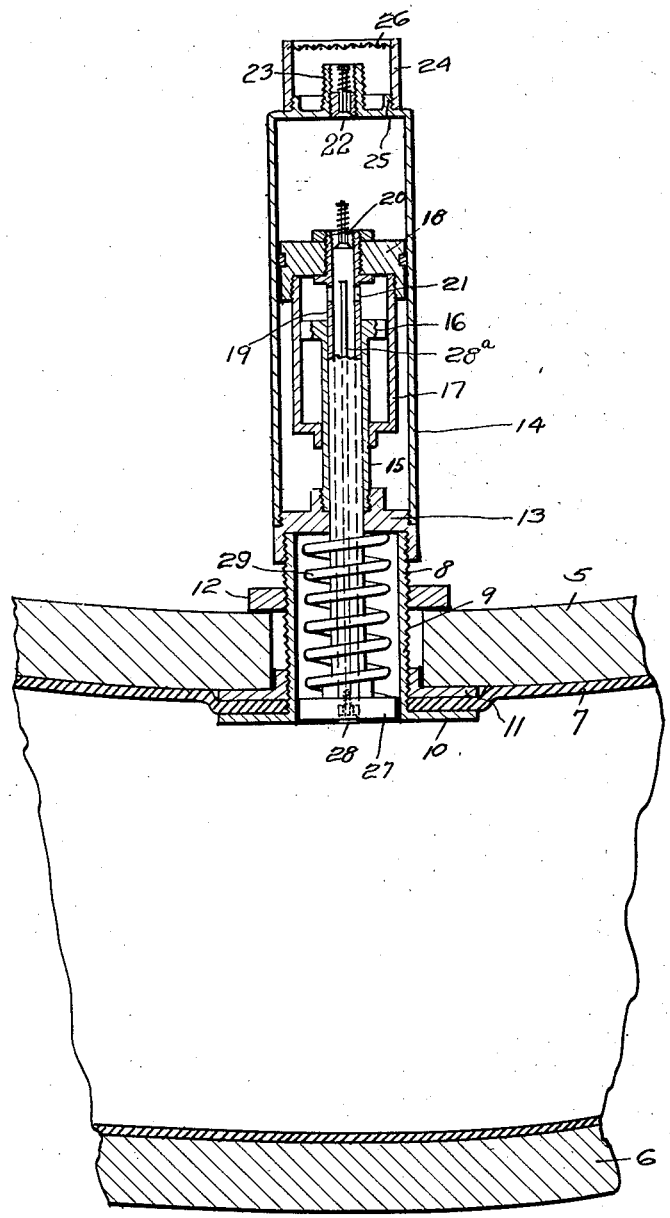

1,566,667

UNITED STATES PATENT OFFICE.

FREDERICK F. FULLER, OF GOVERT, SOUTH DAKOTA.

AUTOMATIC AIR PUMP FOR MOTOR-VEHICLE TIRES.

Application filed April 23, 1924. Serial No. 708,490.

*To all whom it may concern:*

Be it known that FREDERICK F. FULLER, a citizen of the United States, residing at Govert, in the county of Harding and State of South Dakota, has invented certain new and useful Improvements in Automatic Air Pumps for Motor-Vehicle Tires, of which the following is a specification.

This invention relates to an automatic air pump for motor vehicle tires and it has for its object to provide an improved device of this character adapted to automatically maintain adequate pressure in the tires, whereby rim cutting and other objectional results of under-inflation will be avoided.

It is a further object of the invention to provide a structure of the character described which will permit of the inflation of the tire with ordinary inflation means such as an air pump, or the like.

Further objects and advantages of the invention will be set forth in the detailed description which follows:

The figure shown in the accompanying drawing is a vertical sectional view of an automatic tire pump showing the same associated with a part of the vehicle tire.

Referring to the drawing, 5 designates the felly of the wheel, 6 the outer casing of the tire and 7 the inner tube of the tire. In carrying out the invention I secure to the inner tube of the tire a tubular member 8. This tubular member 8 is externally threaded as indicated at 9 and it has an internal flange 10 which coacts with the nut 11 in binding a portion of the inner tube between these parts in order to effect an air tight connection. A nut 12 is threaded upon the tubular member 8 and binds against the inner face of the felly 5. A head 13 is threaded upon the upper end of the member 8 and receives a cylinder 14 and a fixed tube 15 carrying a fixed piston 16. Piston 16 lies within a movable cylinder 17 carried by a main piston 18 which operates in cylinder 14. Piston 18 is carried by a hollow piston rod 19 the inner end of which (or the end toward the hub of the wheel) is closed by a check valve 20 that is removably screwed into the end of the hollow piston rod 19. Ports 21 are formed in piston rod 19. A check valve 22 controls the entry of air to cylinder 14. A threaded extension 23 serves for the attachment of an ordinary inflation pump for independent inflation of the tire if necessary. A dust cap 24 is threaded upon an extension 25 of the cylinder 14 and has a wire gauze cover 26.

The lower end of the hollow piston rod 19 carries a head 27 which slides in the tubular member 8 and a spring 29 bears between this head and the under side of the head 13.

The passageway formed in the hollow piston rod 19 has a check valve 28 at the point where such passageway opens to the interior of the tire, said valve opening toward the interior of the tire, and having an elongated stem 28ª.

The operation of the device is as follows:

The device is worked by the unequal air pressure in the tire caused by the wheel in its rotation passing over obstructions in the road.

When the tire is fully inflated the spring 29 and piston head 27 is completely compressed against head 13 and as this pressure is lowered from any leakage in the tire, spring 29 forces the piston head 27 down toward or against the pressure in the tire, at the same time drawing air into cylinder 14 and forcing air from cylinder 17 into the tire past ports 21 and 28. As the wheel, in its rotation, passes over an obstruction on the road's surface, which increases the pressure of air in the tire, the piston head 27 and spring 29 are again compressed against 13, forcing air from cylinder 14 into cylinder 17 past ports 20 and 21.

In other words say that the pressure supposed to be carried by the tire is 60 pounds; then 60 pounds pressure against piston head 27 and spring 29, holds them fully compressed against head 13 and there is no action of the pump but as soon as this pressure is reduced from, say 60 pounds, to 40 pounds, spring 29 is strong enough to force piston head 27 part way out against said 40 pounds of pressure in the tire and as an obstruction passes under the tire forcing the pressure up say to 60 pounds again the spring 29 and piston head 27 are immediately forced up against head 13 again, causing the action of the pump to be automatic.

It is to be noted that the diameter of cylinder 14 is such as to permit of its being passed through the felly of the wheel. By unscrewing cylinder 14 from tubular member 8 the valve 20 is rendered accessible. By removing the valve stem gauge 28ª is rendered accessible both for the purpose of the pressure in the tire by use of a pressure gauge or for releasing the air in the tire when the tire is to be deflated.

It is to be understood that the invention is not limited to the precise construction, set forth, but that it includes within its purview whatever changes fairly come within either the terms or the spirit of the appended claim.

Having described my invention, what I claim is:

An automatic tire inflating pump comprising a tubular member constructed to have air tight connection with the inner tube of a tire, a cylinder attached thereto, a tube fixed with relation to the cylinder and projecting thereinto, a piston upon the end of said tube, a piston in the first named cylinder, a movable cylinder carried by the last named piston and embracing the first named piston, a hollow piston rod by which the last named piston is carried and which slides through said tube, a pressure head upon the inner end of the hollow piston rod, which is slidable in the tubular member, a spring bearing upon the pressure head for effecting a movement, thereof, in one direction, check valves at each end of the hollow piston rod and a check valve opening into the first named cylinder, there being, ports formed in the hollow piston rods between the two pistons.

In testimony whereof he affixes his signature in the presence of two witnesses.

FREDERICK F. FULLER.